United States Patent
Lau et al.

(10) Patent No.: US 7,583,637 B2
(45) Date of Patent: Sep. 1, 2009

(54) METHODS OF CONTROLLING DATA RATE IN WIRELESS COMMUNICATIONS SYSTEMS

(75) Inventors: Kin Nang Lau, Parsippany, NJ (US);
Youjian Liu, Randolph, NJ (US);
Martin H. Meyers, Montclair, NJ (US);
Susan Wu Sanders, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 971 days.

(21) Appl. No.: 10/355,140

(22) Filed: Jan. 31, 2003

(65) Prior Publication Data

US 2004/0151122 A1  Aug. 5, 2004

(51) Int. Cl.
*H04W 4/00* (2006.01)
(52) U.S. Cl. ............... 370/332; 455/69; 455/522
(58) Field of Classification Search ............. 370/332, 370/389, 232; 714/746, 774; 375/225; 455/69, 455/522
See application file for complete search history.

(56) References Cited

U.S. PATENT DOCUMENTS

| | | | | |
|---|---|---|---|---|
| 5,857,147 | A * | 1/1999 | Gardner et al. | 370/468 |
| 6,546,509 | B2 * | 4/2003 | Starr | 714/704 |
| 6,571,104 | B1 * | 5/2003 | Nanda et al. | 370/332 |
| 6,760,313 | B1 * | 7/2004 | Sindhushayana et al. | 370/252 |
| 6,791,954 | B1 * | 9/2004 | Cheng et al. | 370/311 |
| 6,802,035 | B2 * | 10/2004 | Catreux et al. | 714/746 |
| 6,952,591 | B2 * | 10/2005 | Budka et al. | 455/69 |
| 7,068,601 | B2 * | 6/2006 | Abdelilah et al. | 370/231 |
| 7,130,311 | B2 * | 10/2006 | Yavuz et al. | 370/329 |
| 7,142,562 | B2 * | 11/2006 | Yavuz et al. | 370/437 |
| 7,369,549 | B2 * | 5/2008 | Wu et al. | 370/389 |
| 2002/0018446 | A1 * | 2/2002 | Huh et al. | 370/245 |
| 2003/0123406 | A1 * | 7/2003 | Yavuz et al. | 370/333 |
| 2003/0193906 | A1 * | 10/2003 | Andrews et al. | 370/329 |
| 2003/0231655 | A1 * | 12/2003 | Kelton et al. | 370/468 |
| 2004/0087276 | A1 * | 5/2004 | Attar et al. | 455/63.4 |
| 2004/0176043 | A1 * | 9/2004 | Huh et al. | 455/67.13 |
| 2004/0202196 | A1 * | 10/2004 | Sindhushayana et al. | 370/465 |

(Continued)

OTHER PUBLICATIONS

Yavuz et al. A Method for Outer Loop Rate Control in High Data Rate Wireless Networks. Vehicular Technology Conference. 2002 Proceedings. .VTC 2002-Fall. 2002 IEEE 56th. vol. 3, Sep. 24-28, 2002. pp. 1701-1705.*

(Continued)

*Primary Examiner*—Ricky Ngo
*Assistant Examiner*—Phuongchau B Nguyen (57) ABSTRACT

In an aspect of the method, a received data packet is decoded in order to determine a packet error rate value, and an average package error value for N received data packets is updated based on the determined packet error rate value. The updated average packet error rate value is then compared against a threshold value and a data rate request is issued based on this comparison. In another aspect, a response to a transmitted data packet is received, the response being related to an average packet error rate value. The average packet error rate value is compared against a threshold and a data rate is modified based on the comparison. In each of the above aspects, a data rate control margin that is used to overcome channel estimate errors resulting from transmission delays may be dynamically adjusted, e.g., in real time, in order to optimize system resources.

23 Claims, 4 Drawing Sheets

U.S. PATENT DOCUMENTS

2004/0203809 A1* 10/2004 Au et al. ............... 455/450
2005/0169295 A1* 8/2005 Yun et al. ............... 370/437
2005/0201453 A1* 9/2005 Gu ........................ 375/225
2006/0094367 A1* 5/2006 Miyoshi et al. ......... 455/67.11
2006/0121930 A1* 6/2006 Miyoshi et al. ......... 455/522

OTHER PUBLICATIONS

Yavuz et al. Adaptive Rate Control in High Data Rate Wireless Networks. Wireless Communications and Networking. 2003. WCNC 2003. IEEE, vol. 2, Mar. 16-20, 2003. pp. 866-871.*

* cited by examiner

METHODS OF CONTROLLING DATA RATE IN WIRELESS COMMUNICATIONS SYSTEMS

BACKGROUND OF THE INVENTION

1. Field of the Invention

The present invention generally relates to wireless communications systems, and more particularly to methods for controlling data rate in such systems.

2. Description of Related Art

In a CDMA system, since voice communications cannot tolerate extensive delay, priority is typically given to the transmission of voice traffic over the transmission of data traffic. The amount of voice activity at any given instance is unpredictable and, therefore, in a CDMA system the transmission of data will be adjusted to prevent the reverse link capacity from being exceeded. In addition, since a mobile station may be in soft handoff between multiple cells, the data transmission rate assigned may be based on the reverse link capacity of each of the base stations involved in the soft handoff.

It is anticipated that the demand for higher transmission rates for data will increase for both the forward link and the reverse link, as mobile users are expected to receive and generate increased amounts of data. The forward link signal is the RF signal transmitted from a base station to one or more mobile stations, and a reverse link signal is an RF signal transmitted from a mobile station to a base station.

In anticipation of the need for a system to transmit data at higher rates, a high data rate (HDR) system has evolved. An HDR system, such as a system employing CDMA cdma2000 1xEV-DO technology, relies upon a dedicated 1.25 MHz channel to deliver data at speeds up to 2.4 Mbps. An HDR system shares the same spectrum with an IS-95 or IS-2000 system by using the aforementioned separate 1.25 MHz frequency dedicated to HDR. The HDR forward link uses a single shared channel which always transmits at full power (except for the power control bits). Users are time-multiplexed on the forward channel (instead of code division access) so as to achieve a higher data throughput for a single user. There is no softer/soft handoff on the forward link, since the mobile station only listens to one forward link at any given time. The transmission data rate on the forward link, as well as which sector (the sector is the part of a base station that provides one CDMA channel) in the next desired transmitting forward link is typically determined by the mobile station, with the mobile station indicating the desired or requested data rate in serving sector via a data rate control (DRC) channel on the reverse link.

The base station controls and selects which user's data is to be transmitted in a next forward link slot by using a scheduling algorithm. Each slot is 1.667 ms and each frame is 26.67 ms, as is known, and there are 16 slots per frame. The forward link consists of four types of channels: pilot, Medium Access Control (MAC), control and traffic channels, with the MAC supporting reverse activity, DRC lock and reverse power control channels, as is known. The reverse link has access and traffic channels, with the traffic channel being further divided into a pilot, MAC, ACK and data channel, and with the MAC supporting the DRC channel and a reverse rate indicator (RRI) channel, as is known. When a mobile station is assigned to a reverse traffic channel, the mobile always transmits the pilot, the DRC and the-ACK channels.

Accordingly, in an HDR system, data rate control is necessary for efficiency. In an HDR system, the mobile station typically requests a forward link data rate based on an estimation of a forward traffic channel condition. For example, in decoding a packet, a mobile station may measure a carrier-to-interference or signal-to-noise ratio (SNR) of the pilot signal received from the base station over the forward channel. The mobile station makes this SNR measurement and then adds a margin (a predetermined value) to the measured SNR in order to determine a predicted or estimated SNR, as is known. The predicted SNR is used in order to determine a rate control message that is to be sent to the base station. This rate control message, also known as a rate request message, is transmitted to the base station over the DRC channel on the reverse link. When the base station receives the rate request message, the base station adjusts the rate of the transmitted signals accordingly.

The margin, referred to as a DRC margin, is included to account for transmission delay. For example, there is a delay between the mobile station requesting a forward link data rate, based on estimation of a forward channel condition, and the base station sending the data packet at the requested data rate. Typically the delay is on the order of two slots. Accordingly, the DRC margin is typically set to some value in an effort to overcome the channel estimate errors due to this transmission delay.

To achieve a consistent quality of service (QoS), the value of the DRC margin should account for changing conditions, such as a different fading environment, or a different speed of the mobile station. However, the current existing algorithms set DRC margin at a fixed or predetermined value. Setting the DRC margin at a fixed value prevents efficient tracking of a changing environment which could waste system resources when the mobile station is at low speed and could degrade QoS, such as high encoded packet error rate (EPER) for example, when the mobile is at high speed.

As discussed above, the estimated or predicted SNR is used to determine the rate request message which is sent to the base station over the DRC channel on the reverse link. U.S. Pat. No. 6,416,971 to Wu et al. describes a system to predict signal-to-noise ratio. In FIG. 2 of Wu '971, a prediction selector 82 selects one of a plurality of outputs from signal-to-interference and noise ratio (SINR) predictors 76, 78 and 80. Particularly, prediction selector 82 selects a signal having a smallest standard deviation of prediction error value, which is most representative of the current fading signal environment. The selected SINR prediction is then sent to a rate request generation circuit 44 to determine a desired rate control message.

However, Wu et al. bases each of the individual SINR predictions on a fixed margin "D" which is a predetermined delay factor based on a given packet length. Accordingly, Wu et al. determines predicted SINR based on an open loop solution, using a fixed "guess" for the DRC margin. These fixed DRC margins are not accurate and do not account for transmission delay due to changing environmental conditions or speed of the mobile station, for example.

Additionally, setting a fixed DRC margin may lead to the following possible effects: (a) if there is too much margin used in determining estimated SNR, and estimated SNR is based on the measured SNR minus the DRC margin, then the requested data rate may be too low, because the target packet error rate would be zero percent. Thus system performance would be inefficient (e.g., every received packet would be good, indicating that the transmission rate is too low). If not enough margin is used, target packet error rate could exceed acceptable limits, (e.g., >>1%), thus there would be too much error. The requested data rate would be too high, wasting resources and leading to less efficiency due to the number of errors requiring retransmissions. Thus, using a fixed DRC margin, based on an open loop "guess", is inaccurate and inappropriate for HDR systems.

SUMMARY OF THE INVENTION

A method of data rate control in a wireless communications system is described. In one aspect, a received data packet is decoded in order to determine a packet error rate value, and an average package error rate value for N received data packets is updated based on the determined packet error rate value. The updated average packet error rate value may be compared against a threshold value and a data rate request may be issued based on the comparison.

In another aspect, a response to a transmitted data packet is received, the response being related to an average packet error rate value. The average packet error rate value may be compared against a threshold, and a data rate may be modified based on the comparison. In each of the above aspects, a data rate control (DRC) margin, used to overcome channel estimate errors resulting from transmission delays may be dynamically adjusted, e.g., in real time, so as to optimize system resources.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

The following description may be described as based on a high data rate (HDR) wireless communication system employing CDMA 2000 1xEV-DO technology, or alternatively as based on the recently approved CDMA2000 1xEV-DV which, unlike EV-DO, combines voice and data on a single 1.25 MHz channel in order to provide integrated voice with simultaneous packet data services at speeds of up to 4.8 Mbps, while being backward compatible with CDMA One and CDMA2000 1x. Although embodiments will be described in this exemplary context, it should be noted that the embodiments shown and described herein are meant to be illustrative only and not limiting in any way. As such, various modifications will be apparent to those skilled in the art for application to other communications systems and are contemplated by the teachings herein.

Where used below, an access terminal is a device providing data connectivity to a user. An access terminal may be connected to a computing device such as a laptop, personal computer (PC), or it may be a self-contained data device such as a personal digital assistant (PDA). Accordingly, an access terminal is equivalent to, and may be also be referred to as, a mobile station, wireless mobile, remote station, user, user equipment (UE) or any other remote user of wireless resources in a wireless communications network.

Additionally, an access network refers to network equipment providing data connectivity between a packet switch data network, typically the Internet, and the access terminals. An access network is equivalent to, and may also be referred to as, a base station or Node-B. An access network may also compose one or more base stations. Further, and unless otherwise identified below, the model architecture, protocol and channel structure described herein may be based on the technical document developed by the Third Generation Partnership Project 2 (3GPP2) entitled, "cdma2000 High Rate Packet Data Air Interface Specification", 3GPP2 C.S0024, Version. 3.0 and subsequent versions.

Figure 1:
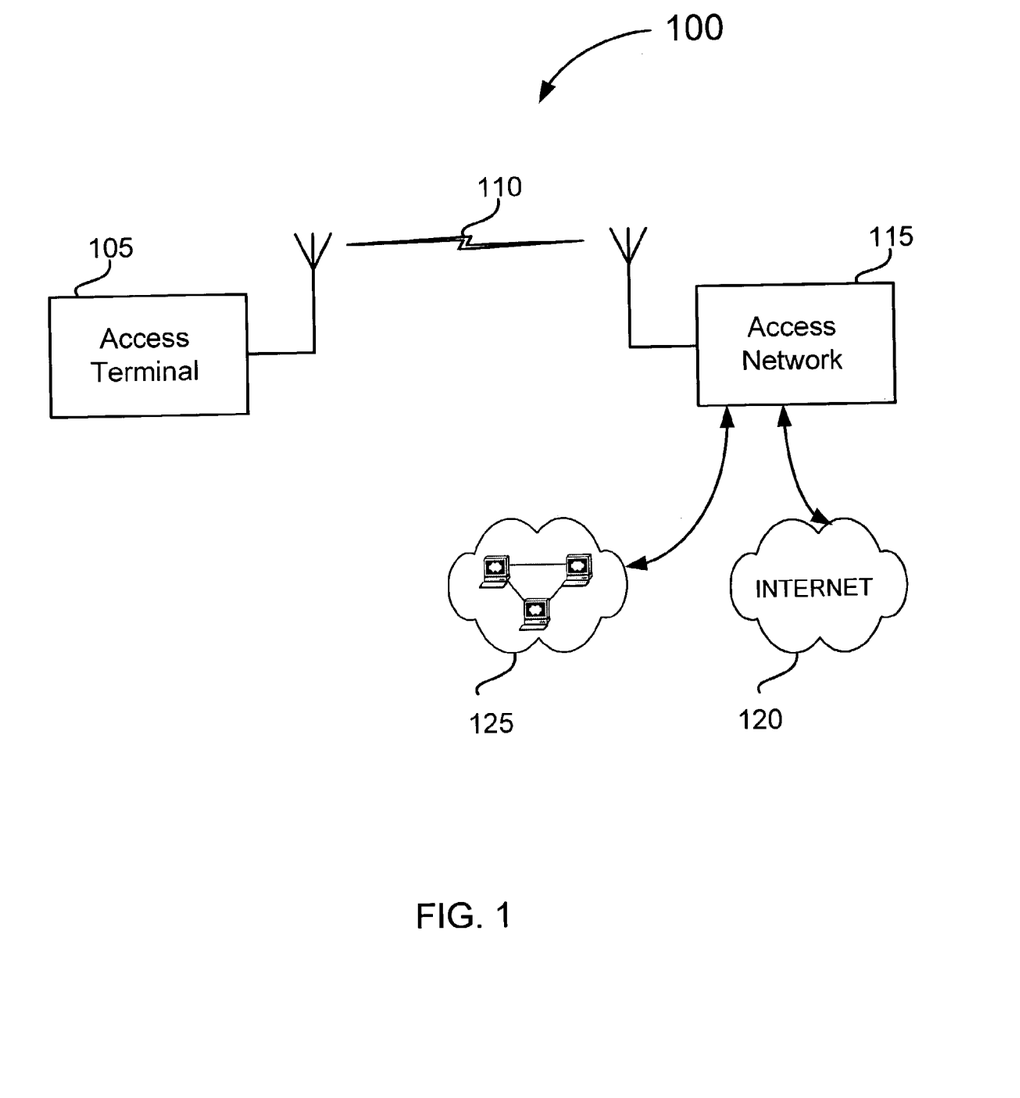
FIG. 1 is a diagram of an exemplary high data rate wireless system.

FIG. 1 is a block diagram of an exemplary HDR wireless communication system 100. HDR system 100, which may also be configured as an HDR system employing EV-DV technology, illustrates an access terminal 105 in communication with an access network 115. Access terminal 105 communications through access network 115 to exchange packet data with the Internet 120 or some other packet data network 125, such as a closed corporate network (e.g., intranet) for example. Examples of packet data may include Internet Protocol (IP) datagrams used for applications such as accessing web pages and retrieving email. Such packet data applications may run on access terminal 105, or may run on a separate computer device that uses access terminal 105 as a wireless modem. In an exemplary embodiment, access terminal 105 communications with wireless network 115 over an air interface 110, which may be a set of forward and reverse channels for example.

Access network 115 may consist of a single base station and base station controller, or may include a plurality of separately located wireless base stations and a base station controller connected together as an aggregate access network 115. Each base station has a predetermined number of traffic channels to use for exchanging data with access terminals 105. When one of the traffic channels is assigned to an access terminal 105, that access terminal 105 may be referred to as an active access terminal 105. At least one traffic channel is assigned to each active access terminal 105. Access network 115 may be connected with packet data network 120 using any appropriate type of network connection, such as wireless or wire-line T1 or T3, fiber optic connection, Ethernet, etc. Access network 115 may be connected to multiple packet data networks having more than one type. For example, instead of an intranet, another network 125 might be a public switched telephone network (PSTN) connected with access network 115 through a data services inter-working function (IWF).

In an exemplary embodiment, access terminal 105 continuously monitors transmissions from access network 115 over a forward traffic channel in order to estimate the carrier-to-interference ratio, hereinafter referred to as measured signal-to-noise ratio ($SNR_{MEAS}$) of the channel. Access terminal 105 may periodically send a data rate control (DRC) request to access network 115, indicating a maximum data rate at which the access terminal 105 can receive data based on a previous $SNR_{MEAS}$ and based on a dynamically determined (e.g., in real time) data rate control margin parameter ($DRC_{MARGIN}$). The $DRC_{MARGIN}$ may be variable, and can change on a packet-by-packet basis with changes in the access terminal 105's position, speed or changes in the surrounding environment (e.g., should the access terminal 105 be subject to a fading condition). An estimated signal-to-noise ratio ($SNR_{EST}$) may be determined based on $SNR_{MEAS}$ and the determined $DRC_{MARGIN}$, as will be described in further detail below. As will also be further seen below, multiple $DRC_{MARGINS}$ may be determined by the method of the present invention.

In one aspect, a closed loop solution may provide feedback to inform the access terminal 105 (or access network 115) how successful the selected $DRC_{MARGIN}$ is to overall performance. The access network 115 schedules the access terminal 105 for receiving a data packet based on the requested data rate (e.g. DRC value); and the access network 115 sends the access terminal 105 the data packet(s) at the scheduled time, at the requested data rate. Normally, the access terminal 105 may not be able to decode the received data packet if the requested data rate is too large; however, by dynamically determining $DRC_{MARGIN}$, data rate may be controlled so that the requested data rate is consistent with the surrounding environment, speed or position of the access terminal 105.

Figure 2:
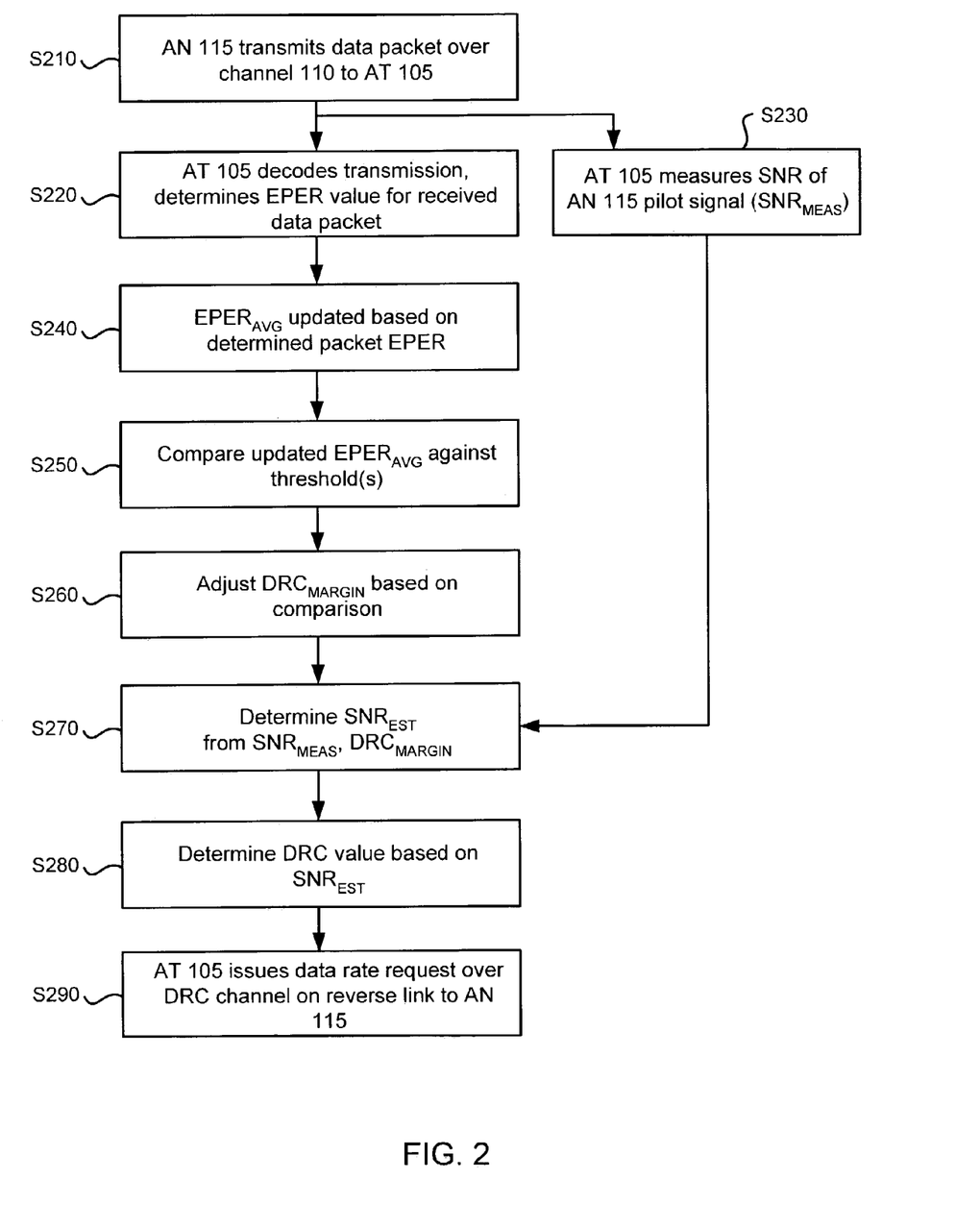
FIG. 2 is a flow chart illustrating the method in accordance with an exemplary embodiment of the invention.

FIG. 2 is a flow chart illustrating a method of controlling data rate in accordance with an exemplary embodiment of the invention. The air interface 110 is layered, as is known, where each layer consists of one or more protocols that perform a layer's functionality. For the purposes of this invention, we are focused on the physical layer, which defines the physical layer channels in the forward and reverse channel hierarchies, as briefly described above.

In particular, access network 115 uses the forward traffic channel, which is a portion of the forward channel that carries information for a specific access terminal 105. Prior to successful access terminal 105 authentication, a forward traffic channel serves as a non-dedicated resource, but may be used as a dedicated resource for the specific access terminal 105 after successful access terminal 105 authentication, as is known. Access network 115 sends data over the traffic channel portion of the forward channel, and a pilot over the pilot channel portion of the forward channel of air interface 110 to designated access terminal 105 (Step S210). As the received data packets are all encoded, access terminal 105 must decode (Step S220) the transmission. In doing so, access terminal 105 determines an encoded packet error rate (EPER) for the forward channel. The access terminal 105 may include a digital signal processor (DSP) or application specific integrated circuit (ASIC) to continuously and constantly measure EPER (e.g.,) on a packet-by-packet basis, for example.

Concurrently, access terminal 105 also measures the carrier-to-interference ratio ($SNR_{MEAS}$) from the pilot signal received over the pilot channel portion of the forward channel, as is known (Step S230). Additionally, access terminal 105 constantly updates (Step S240) an average EPER value ($EPER_{AVG}$), which will be used to compare against a threshold to determine whether or not a $DRC_{MARGIN}$ needs to be adjusted. Access terminal 105 may contain circuitry such as an application specific integrated circuit (ASIC) to perform the $SNR_{MEAS}$ calculation, and a averaging circuit such as a sliding window averaging filter for example, to constantly update $EPER_{AVG}$ in a sliding window that changes with time, as is known.

The updated $EPER_{AVG}$ is compared against at least one threshold (Step S250). The threshold may be determined as a function of a target packet error rate (TPER) of the forward link, which is known by the access terminal 105. TPER may be set at one percent (1%) for example, but is not limited to that value. As will be seen in further detail, the threshold may also include a specified constant rate that may be applied to the target packet error rate (TPER), in determining whether or not $DRC_{MARGIN}$ needs to be adjusted. Based on the comparison of $EPER_{AVG}$ to one or more thresholds, $DRC_{MARGIN}$ may be adjusted (Step S260). Based on the adjusted $DRC_{MARGIN}$, the estimated signal-to-noise ratio ($SNR_{EST}$) may be determined. $SNR_{EST}$, which accounts for transmission delays between the access terminal 105 requesting a forward link data rate and the access network 115 sending a data packet at the requested data rate due to changing environmental conditions, speed or movement by the access terminal 105 for example, may be calculated by the following expression:

$$SNR_{EST}=SNR_{MEAS}-DRC_{MARGIN}. \quad (1)$$

$DRC_{MARGIN}$ may be dynamically determined on a frame-by-frame basis, and the $SNR_{EST}$ may be determined with greater accuracy, since a closed loop solution is being used, based on the known, final EPER value that is determined with every packet while the access terminal 105 decodes each received data packet. Since the $SNR_{EST}$ may be predicted with greater accuracy, the $SNR_{EST}$ may be used to determine a DRC value (Step S280) as is known. For example, processing circuitry in access terminal 105 may refer to a stored look-up table (LUT) in order to translate $SNR_{EST}$ into a DRC value. Values that could be stored in an exemplary LUT are shown below in Table 1, where $SNR_i <= SNR_i+1$, where i= 1,2, . . . 12. For example, if $SNR_2 < SNR_{EST} < SNR_3$, DRC=2. This LUT is merely implementation specific; it can be tailored to specific applications.

TABLE 1

| DRC Value | $SNR_{EST}$ Value |
|---|---|
| 1 | $SNR_1$ |
| 2 | $SNR_2$ |
| 3 | $SNR_3$ |
| 4 | $SNR_4$ |
| 5 | $SNR_5$ |
| 6 | $SNR_6$ |
| 7 | $SNR_7$ |
| 8 | $SNR_8$ |
| 9 | $SNR_9$ |
| 10 | $SNR_{10}$ |
| 11 | $SNR_{11}$ |
| 12 | $SNR_{12}$ |

The DRC Value is typically in a hexadecimal form, and, specifies the packet data rate and the packet length at which the access network 115 is requested to transmit data packets. The following Table 2, defined in 3GPP2, C.S0024, Ver. 3.0 describes exemplary packet data rates and packet lengths for DRC values:

TABLE 2

| DRC Value | Rate (kbps) | Packet Length (Slots) |
|---|---|---|
| 0x0 | null rate | N/A |
| 0x1 | 38.4 | 16 |
| 0x2 | 76.8 | 8 |
| 0x3 | 153.6 | 4 |
| 0x4 | 307.2 | 2 |
| 0x5 | 307.2 | 4 |
| 0x6 | 614.4 | 1 |
| 0x7 | 614.4 | 2 |
| 0x8 | 921.6 | 2 |
| 0x9 | 1228.8 | 1 |
| 0xa | 1228.8 | 2 |
| 0xb | 1843.2 | 1 |
| 0xc | 2457.6 | 1 |
| 0xd | Invalid | N/A |
| 0xe | Invalid | N/A |
| 0xf | Invalid | N/A |

Based on the $SNR_{EST}$, the access terminal 105 may set the DRC value to the maximum value that channel conditions permit for the sector at which the access terminal 105 is pointing its DRC value. The access terminal 105 uses the null rate if the channel conditions do not permit even the lowest non-null rate. Thus, the access terminal 105 may issue a data rate request over the DRC channel (Step S290) to access network 115 (e.g., the access network 115) When the access network 115 receives the data rate request, the access network 115 adjusts the rate of the transmitted signals accordingly.

Figure 3:
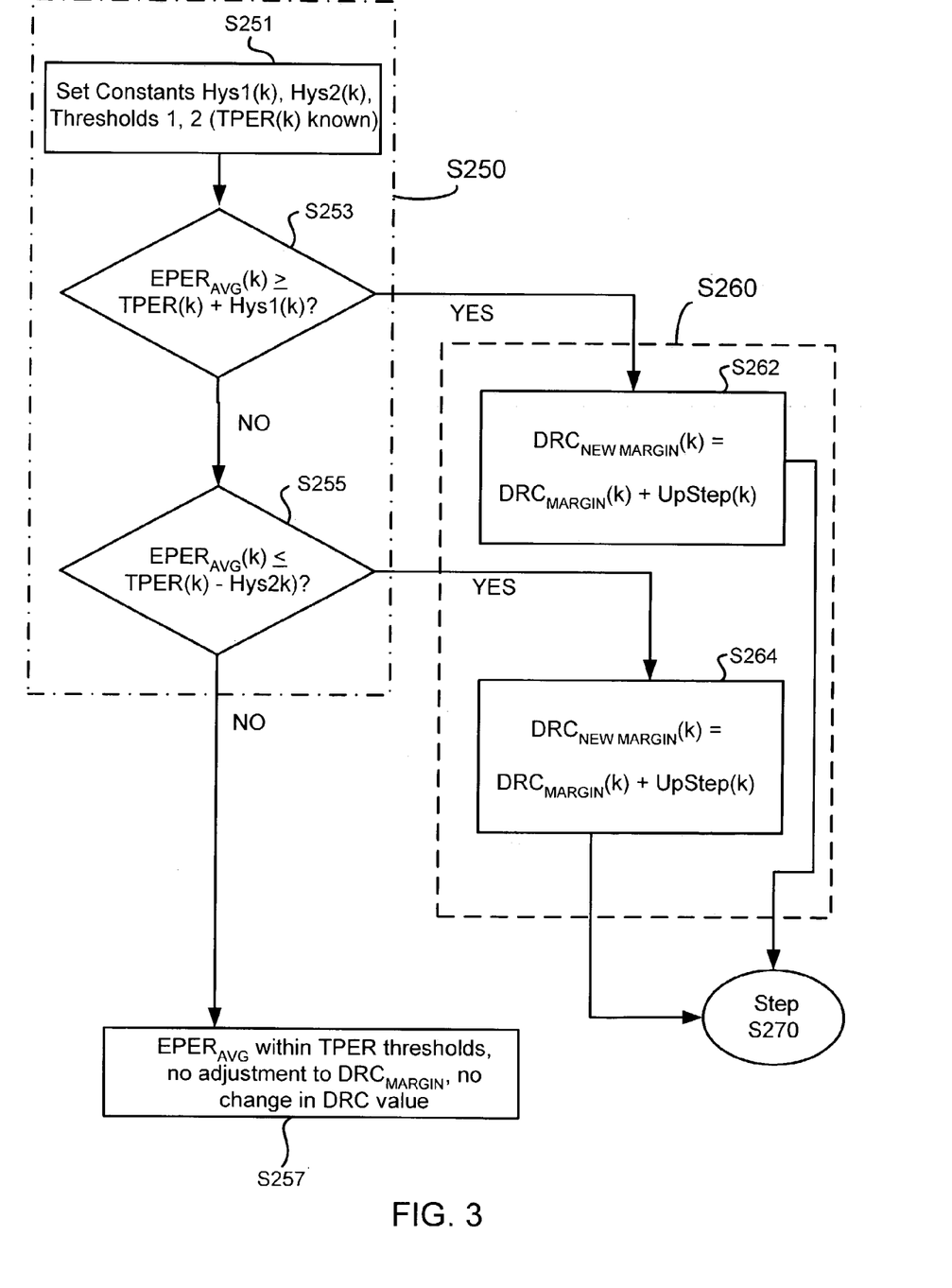
FIG. 3 is a flow chart illustrating comparing and adjusting steps of FIG. 2 in greater detail in accordance with an exemplary embodiment of the invention.

FIG. 3 is a flow chart illustrating the comparing and adjusting steps of FIG. 2 in more detail in accordance with an exemplary embodiment of the invention. As discussed above, $DRC_{MARGIN}$ may be dynamically adjusted so as to track fading environment changes and positional changes of the access terminal 105 within HDR system 100. The comparing and adjusting steps outlined in FIG. 2 may be defined by the following expression (all values in percentages (%)):

%%% Update $DRC_{MARGIN}$ %%%
    Hys1(k)=3;Hys2(k)=0;
(i) if $EPER_{avg}(k)*100 >= TPER(k)+Hys1(k)$,
    $DRC_{MARGIN(new)}(k) = DRC_{MARGIN}(k)+UpStep(k)$;    (2)
(ii) else if $EPER_{AVG}(k)*100 < TPER(k)-Hys2(k)$,
    $DRC_{MARGIN(new)}(k) = DRC_{MARGIN}(k)-DownStep(k)$;
end
%%% End of Update $DRC_{MARGIN}$ %%%

Referring to expression (2), k represents the DRC value, Hys1(k) and Hys2(k) represent specified constants that may be used in each of a first threshold and a second threshold. $EPER_{AVG}(k)$ represents the average EPER that is constantly monitored across the sliding window, changing over time. Line (i) in the above expression (2) is a comparison of $EPER_{AVG}$ against a first threshold, where the first threshold is defined by a known target packet error rate (TPER(k)) and a specified constant Hys1(k). For exemplary purposes only, TPER may be set to 1% and Hys 1 may be set to 3%, as is shown in the expression (2), it being understood that any value may be substituted for TPER(k) and Hys1(k). Thus, if $EPER_{AVG}$ exceeds four percent, which would be the first, or upper boundary of a threshold range, then $DRC_{MARGIN}$ needs to be adjusted upward (e.g., too much error). Accordingly, $DRC_{MARGIN(new)}$ represents the adjusted $DRC_{MARGIN}$ and, in the case that the upper boundary is exceeded, equals the current $DRC_{MARGIN}$ plus an upstep adjustment (Upstep(k)).

On the other hand, if $EPER_{AVG}$ is less than the second threshold (see line (ii) in the above expression (2)—in this exemplary case the second threshold is equal to 1% (Hys2(k)=0) and represents a low end of a threshold range) then $DRC_{MARGIN}$ should be decreased by a down adjust step (Downstep(k)). This is because the average packet error rate has fallen below TPER(k) and resources are being wasted, since a goal is to maintain $EPER_{AVG}$ about at TPER(k) over the forward channel of air interface 110 for maximum efficiency.

Referring now to FIG. 3, the first and second thresholds are initially set (Step S251) for comparison against $EPER_{AVG}$. If $EPER_{AVG}$ exceeds or is equal to the first threshold (the output of Step S253 is YES), then $DRC_{MARGIN}$ is adjusted by adding an upstep to the current $DRC_{MARGIN}$ (Step S262). The adjusted $DRC_{MARGIN}$, denoted as $DRC_{MARGIN(new)}$ may then be used in the calculation of $SNR_{EST}$ (Step S270). If the output of Step S253 is NO, then $EPER_{AVG}$ is compared against the second threshold (Step S255). If the output of Step S255 is YES, the $DRC_{MARGIN}$ is adjusted accordingly (Step S264) and the adjusted $DRC_{MARGIN}$ is applied to the calculation of $SNR_{EST}$ (Step S270). However, if the output of Step S255 is NO, this indicates that an encoded packet error rate is within an acceptable threshold range (e.g., it is close enough to the TPER(k)), therefore no adjustment to $DRC_{MARGIN}$ is required (Step S257).

Therefore, based on the dynamically determined $DRC_{MARGIN}$, estimated signal-to-noise ratio ($SNR_{EST}$) can be determined with greater accuracy to account for the transmission delays between the access network 115 and the access terminal 105. For example, and referring to expression (1), where a $DRC_{MARGIN}$ is increased for a particular data packet, $SNR_{EST}$ is reduced. Accordingly, the DRC value selected from Table 1 (and data rate from Table 2) will be smaller. Since the data rate request indicates a reduced DRC value (e.g., a reduced data rate and increased packet length), access network 115 will reduce the transmission rate for subsequent transmission signals, conserving resources. On the other hand, a reduction in $DRC_{MARGIN}$ indicates an increased $SNR_{EST}$, which means that the requested data rate will increase. Thus, the DRC (hexadecimal) value selected from Table 2 will be larger, indicating a higher data rate and shorter packet length, requesting the access network 115 to increase transmission rate so as to maintain an acceptable TPER and to maximize efficiency of resources.

Accordingly, the method in accordance with the above embodiment efficiently utilizes all available system resources and guarantees QoS (e.g., metrics that affect the quality of a data service that is delivered to an end user, such as throughput, guaranteed bit rate, delay, etc.) at all access terminal speeds. Further, the algorithm defined in expression 2 does not require complex processing circuitry within the access terminal, and may be implemented as part of a DSP or ASIC, for example.

Figure 4:
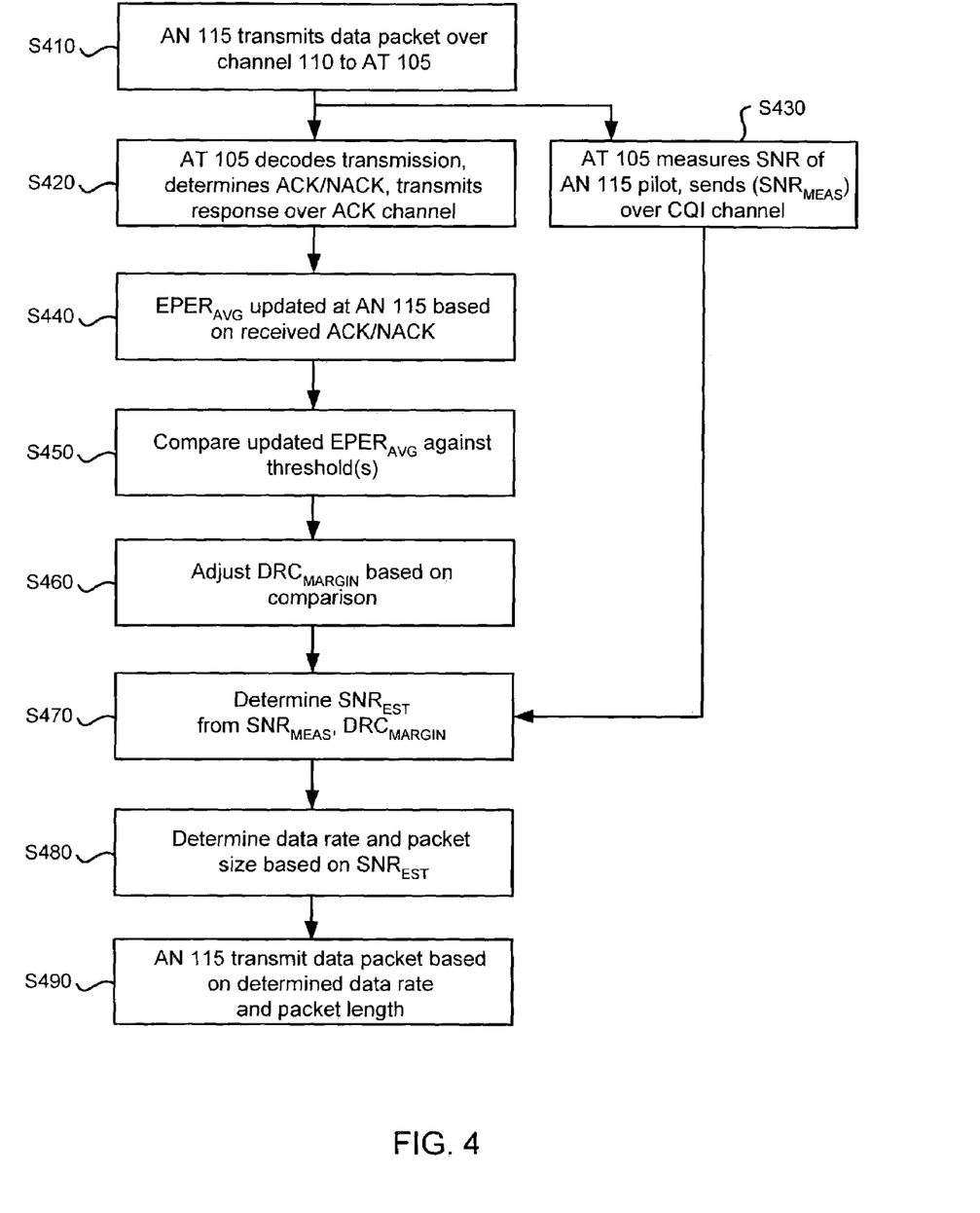
FIG. 4 is a flow chart illustrating a method in accordance with another exemplary embodiment of the invention.

FIG. 4 is a flow chart illustrating a method in accordance with another embodiment of the present invention. To this point, the exemplary embodiment has been described with respect to a HDR wireless system. However, the method may be implemented in systems using the recently accepted CDMA2000 1xEV-DV technology, also referred to as CDMA2000 (Release C). This specification describes a reverse CDMA channel that contains a reverse channel quality indicator channel (R-CQICH), as defined in section 2.1.3.8 of the 3GPP2 document entitled "Physical Layer Standard for cdma2000 Spread Spectrum Systems—Release C", 3GPP2 C.S002-C, Ver. 1.0.

In a wireless communications system employing EV-DV technology, some of the functions described in the above embodiment are performed at the access network 115, instead of at the access terminal 105. For example, in an EV-DV system, an access terminal does not request a data rate; thus there is no reverse DRC channel is EV-DV system. Instead, the access terminal or mobile station has a reverse CQI channel in an EV-DV system. This channel is the portion of the reverse channel that is used by the access terminal to indicate to an access network the quality of a forward link pilot channel received at the access terminal. The CQI information thus may carry the $SNR_{MEAS}$ information, and may be sent by the access terminal over the R-CQICH every 1.25 ms, as described in the specification.

Referring now to FIG. 4, the access network 115 transmits a data packet (Step S410) as described in the first embodiment. However, the type of response message received from the access terminal 105 will determine how $DRC_{MARGIN}$ is to be adjusted. The access terminal 105 decodes (Step S420) the transmission and based on the transmission sends a response message, which may be an acknowledgement (ACK) if the data packets will receive satisfactorily, or a negative acknowledgment (NAK) if there were errors. The response message is transmitted over the reverse ACK channel to the access network 115. Concurrently, the access terminal 105 measures the SNR of the access network 115 pilot signal, and sends $SNR_{MEAS}$ within the CQI information over the R-CQICH channel to the access network 115 (Step S430).

At the access network 115, $EPER_{AVG}$ is updated based on the ACK/NAK received over the reverse ACK channel from the access terminal 105. The access network 115 contains circuitry such as an ASIC or DSP to iterate the threshold comparisons in expression (2). So the access network 115 can compare $EPER_{AVG}$ against the two thresholds to see if $DRC_{MARGIN}$ requires adjustment. In particular, the updated $EPER_{AVG}$ is compared against at least one threshold (Step S450), and $DRC_{MARGIN}$ is adjusted based on the comparison (Step S460) as described above with respect to FIG. 2.

$SNR_{EST}$ may be determined from $SNR_{MEAS}$ and $DRC_{MARGIN}$, similar to as described in a previous embodiment, since the access terminal 105 transmits the $SNR_{MEAS}$ value on the R-CQICH to access network 115. Based on the calculated $SNR_{EST}$, the access network 115 can refer to LUTs similar to as described in Tables 1 and 2, for example, in order to determine data rate and packet size at which to transmit a next data packet (Step S480). The access network 115 then transmits the packet based on the determined packet data rate and packet size (Step S490). Accordingly, $DRC_{MARGIN}$ may be dynamically adjusted on a packet-by-packet basis similar to as described in the first embodiment.

As discussed above, access terminal 105 does not request a data rate in an EV-DV system. There is no DRC channel is EV-DV system. The access terminal 105 reports measured SNR and sends the $SNR_{MEAS}$ on the reverse-CQI channel to the access network 115. Hence the access terminal 115 can calculate $SNR_{EST}$ based on $SNR_{MEAS}$ and $DRC_{MARGIN(new)}$. The following scenarios further illustrate how reception of an ACK or a NAK may affect $DRC_{MARGIN}$ and hence $SNR_{EST}$.

If the access network 115 receives an ACK from access terminal 105, this means that the transmission was received without errors and that EPER of the packet was zero. Therefore, the average packet error rate $EPER_{AVG}$ over that time window decreases. In evaluating $EPER_{AVG}$ against expression (2), the lower end of the threshold range (e.g., second threshold) may be violated. Therefore, $DRC_{MARGIN(new)}$ will decrease and thus causes estimated SNR to increase. Since $SNR_{EST}$ has increased, the access network 115 will increase transmission rate in order to maintain an acceptable target packet error rate over the forward link. In EV-DV system, the access network 115 determines packet data rate.

On the other hand, if a NAK is received, the access network 115 knows that its previous transmission contained errors and that the EPER of the sent packets will be greater than zero, which in turn will increase $EPER_{AVG}$. The increased $EPER_{AVG}$ may exceed the first threshold, which would cause an upstep adjustment to $DRC_{MARGIN}$ and hence will lead to a reduced $SNR_{EST}$. Thus, transmission rate will accordingly, so as to maintain an acceptable TPER and to maximize system resources.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of data rate control in a wireless system, comprising:

decoding a received data packet to determine a packet error rate value;

updating an average packet error rate value for N received data packets based on said determined packet error rate value;

comparing said updated average packet error rate value against at least one threshold packet error rate value based on a requested transmission rate;

issuing a data rate request based on said comparison;

measuring a signal to noise ratio value ($SNR_{MEAS}$) associated with the decoded data packet;

adjusting a data rate control margin parameter ($DRC_{MARGIN}$) that is used to overcome channel estimate errors resulting from transmission delays based on said comparison; and estimating a signal to noise ratio value ($SNR_{EST}$) that accounts for transmission delays based on said $SNR_{MEAS}$ and said adjusted $DRC_{MARGIN}$, wherein said issued data rate request is based on said $SNR_{EST}$.

2. The method of claim 1, wherein said updating includes calculating an average encoded packet error rate ($EPER_{AVG}$) on a per-packet basis over a sliding window, said $EPER_{AVG}$ changing with time.

3. The method of claim 1, wherein said adjusting is performed in real time.

4. The method of claim 1, wherein
   said at least one threshold value is selected from one of a first threshold and a second threshold,
   said adjusting further includes increasing said $DRC_{MARGIN}$ if the average packet error rate value is equal to or exceeds the first threshold, and
   said $SNR_{EST}$ being reduced as defined by an expression $$SNR_{EST}=SNR_{MEAS}-DRC_{MARGIN}.$$

5. The method of claim 4, wherein said issuing a data rate request further includes:
   determining a DRC value using said $SNR_{EST}$, and
   sending said DRC value to specify the requested data rate.

6. The method of claim 1, wherein said issuing a data rate request further includes sending a data rate control, DRC, value that specifies the requested transmission rate based on said $SNR_{EST}$.

7. The method of claim 1, wherein said comparing is defined by an expression $$EPER_{AVG}(k) \geq TPER(k)+Hys1(k),$$

where k represents a data rate control DRC value specifying the requested transmission rate, $EPER_{AVG}(k)$ is an average encoded packet error rate, $TPER(k)+Hys1(k)$ representing said at least one threshold value, $TPER(k)$ is the target packet error rate, and $Hys1(k)$ is a specified constant rate.

8. The method of claim 7, said adjusting further defined by an expression:

$$DRC_{MARGIN(new)}=DRC_{MARGIN}+\text{UpStep, if } EPER_{AVG}(k) \geq TPER(k)+Hys1(k),$$

where UpStep is a specified increase adjustment to said $DRC_{MARGIN}$.

9. The method of claim 1, wherein
   said at least one threshold value is selected from one of a first threshold and a second threshold,
   said adjusting further including decreasing $DRC_{MARGIN}$ if the average packet error rate value is less than a second threshold value, and
   said $SNR_{EST}$ being increased as defined by an expression $$SNR_{EST}=SNR_{MEAS}-DRC_{MARGIN}.$$

10. The method of claim 9, wherein said issuing a data rate request further includes:

determining a DRC value using said $SNR_{EST}$, and sending said DRC value to specify the requested data rate.

11. The method of claim 1, wherein said comparing is defined by an expression $$EPER_{AVG}(k) < TPER(k) - Hys2(k),$$

where k represents a data rate control (DRC) value specifying the requested transmission rate, $EPER_{AVG}(k)$ is an average encoded packet error rate, TPER(k) is the target packet error rate, and Hys(2) is a specified constant rate.

12. The method of claim 11, said adjusting further defined by an expression:

$DRC_{MARGIN(new)} = DRC_{MARGIN} - DownStep$, if $EPER_{AVG}(k) < TPER(k) - Hys2(k)$, where DownStep is a specified decrease adjustment to $DRC_{MARGIN}$.

13. A method of data rate control in a wireless system, comprising:

receiving a response to a transmitted data packet, the response indicative of a change in calculated average packet error rate;

comparing an updated average packet error rate value against a threshold packet error rate value based on a requested transmission rate; and modifying a data rate based on said comparison;

measuring a signal to noise ratio value ($SNR_{MEAS}$) associated with the transmitted data packet;

estimating a signal to noise ratio value ($SNR_{EST}$) that accounts for transmission delays based on said $SNR_{MEAS}$ and said modified data rate.

14. The method of claim 13, further comprising:

adjusting a data rate control margin parameter ($DRC_{MARGIN}$) that is used to overcome channel estimate errors resulting from transmission delays based on said comparison.

15. The method of claim 13, wherein said adjusting is performed in real time.

16. The method of claim 13, wherein said receiving further includes receiving an acknowledgment (ACK) message, said ACK message indicating a decrease in calculated average packet error rate.

17. The method of claim 13, wherein said receiving further includes receiving a negative acknowledgment (NAK) message, said NAK message indicating an increase in calculated average packet error rate.

18. A method of determining a data rate control margin ($DRC_{MARGIN}$) for data rate control in a wireless system, the $DRC_{MARGIN}$ used to overcome channel estimate errors resulting from transmission delay, comprising:

decoding a received data packet to determine a packet error rate value;

updating an average packet error rate value for N received data packets based on said determined packet error rate value;

comparing said updated packet error rate value against a threshold packet error rate value based on a requested transmission rate;

determining an adjustment to $DRC_{MARGIN}$ based on said comparison;

measuring a signal to noise ratio value ($SNR_{MEAS}$) associated with the decoded data packet;

estimating a signal to noise ratio value ($SNR_{EST}$) that accounts for transmission delays based on said $SNR_{MEAS}$ and said adjusted $DRC_{MARGIN}$.

19. The method of claim 18, further comprising issuing a data rate request based on said determined adjustment to $DRC_{MARGIN}$.

20. The method of claim 18, wherein said determining is performed in real time.

21. A method of determining a data rate control margin ($DRC_{MARGIN}$) for data rate control in a wireless system, the $DRC_{MARGIN}$ used to overcome channel estimate errors resulting from transmission delay, comprising:

receiving a response to a transmitted data packet;

updating an average packet error rate value based on said received response;

comparing said updated packet error rate value against a threshold packet error rate value based on a requested transmission rate;

determining an adjustment to said $DRC_{MARGIN}$ based on said comparison;

measuring a signal to noise ratio value ($SNR_{MEAS}$) associated with the transmitted data packet; and estimating a signal to noise ratio value ($SNR_{MEAS}$) that accounts for transmission delays based on said $SNR_{MEAS}$ and said adjusted $DRC_{MARGIN}$.

22. The method of claim 21, further comprising adjusting a data rate based on said determined adjustment to $DRC_{MARGIN}$.

23. The method of claim 21, wherein said determining is performed in real time.

* * * * *

UNITED STATES PATENT AND TRADEMARK OFFICE
CERTIFICATE OF CORRECTION

| | | |
|---|---|---|
| PATENT NO. | : 7,583,637 B2 | Page 1 of 1 |
| APPLICATION NO. | : 10/355140 | |
| DATED | : September 1, 2009 | |
| INVENTOR(S) | : Lau et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1428 days.

Signed and Sealed this

Fourteenth Day of September, 2010

David J. Kappos
*Director of the United States Patent and Trademark Office*